United States Patent [19]

Blum et al.

[11] Patent Number: 5,280,062
[45] Date of Patent: Jan. 18, 1994

[54] AQUEOUS POLYESTERS, A PROCESS FOR THEIR PRODUCTION AND THEIR USE IN HIGH-SOLIDS STOVING LACQUERS

[75] Inventors: Harald Blum, Wachtendonk; Hans-Heribert Burgdörfer, Cologne; Armin Sickert, Krefeld; Peter Höhlein, Kempen, all of Fed. Rep. of Germany

[73] Assignee: Bayer Aktiengesellschaft, Leverkusen, Fed. Rep. of Germany

[21] Appl. No.: 821,102

[22] Filed: Jan. 15, 1992

[30] Foreign Application Priority Data

Jan. 22, 1991 [DE] Fed. Rep. of Germany ....... 4101697

[51] Int. Cl.⁵ .................. C08J 3/00; C08K 3/20; C08L 75/00
[52] U.S. Cl. .................. 524/591; 524/839; 524/840
[58] Field of Search .................. 524/591, 839, 840

[56] References Cited

U.S. PATENT DOCUMENTS 4,608,413  8/1986  Nachtkamp et al. .......... 524/840
5,004,779  4/1991  Blum et al. .......... 524/591

FOREIGN PATENT DOCUMENTS 140323   5/1985   European Pat. Off.
157291  10/1985   European Pat. Off.
218906   3/1987   European Pat. Off.
427028   5/1991   European Pat. Off.
3516806 11/1986   Fed. Rep. of Germany

OTHER PUBLICATIONS

Die Angewandte Makromolekulare Chemie 123/124 (1984), pp. 285 to 306 and 437 et seq.

Primary Examiner—Paul R. Michl
Assistant Examiner—Patrick Niland
Attorney, Agent, or Firm—Joseph C. Gil; Thomas W. Roy

[57] ABSTRACT

The present invention relates to aqueous polyesters for high-solids stoving coatings which contain a) 35.0 to 65.0% by weight of a polyester resin containing urethane, carboxyl and hydroxyl groups and containing the reaction product of
  1) 77 to 89% by weight of a branched polyester polyol having a hydroxyl number of 125 to 175, an acid number of less than 4 and a molecular weight of 2,500 to 6,500,
  2) 2.5 to 4.5% by weight of a 2,2-bis-(hydroxymethyl)alkane carboxylic acid,
  3) 0 to 3.5% by weight of a diol component having a molecular weight of 62 to 250 and
  4) 9 to 19% by weight of a diisocyanate component, wherein the percentages of a1), a2), a3) and a4) add up to 100%, based on the weight of a1), a2), a3) and a4), b) 0.1 to 1.5% by weight of a basic neutralizing agent which is sufficient to convert 35 to 100% of the carboxyl groups of component a) to carboxylate groups, c) 0 to 7.5% by weight of an organic auxiliary solvent and d) 26 to 64.9% by weight water, wherein the percentages of a), b), c) and d) add up to 100%, based on the weight of a), b), c) and d).

6 Claims, No Drawings

AQUEOUS POLYESTERS, A PROCESS FOR THEIR PRODUCTION AND THEIR USE IN HIGH-SOLIDS STOVING LACQUERS

BACKGROUND OF THE INVENTION

1. Field of the Invention

This invention relates to aqueous polyesters for high-solids stoving lacquers which contain urethane, carboxylate and hydroxyl groups and only small quantities of organic auxiliary solvents and volatile neutralizing agents, to a process for the production of these polyesters and to their use.

2. Description of the Prior Art

It is known that water-based binders which have a relatively high solids content and contain little or no organic auxiliary solvent can be produced by using internal or external nonionic emulsifiers (cf. for example Die Angewandte Makromolekulare Chemie 123/124 (1984), pages 285 to 306 and pages 437 et seq) and D. H. Solomon, "The Chemistry of Organic Film Formers", John Wiley & Sons, Inc. (1967) pages 280 et seq. Since these emulsifiers remain in the film even after curing, they can adversely affect the properties of the coatings, including their resistance to water, detergents and weathering. Another problem of nonionic emulsions of the type in question is their generally poor stability, for example, to shear stressing during the production of lacquers, such that they tend to coagulate. In addition, it is not possible to obtain high-gloss coatings from these products.

Water dilutability of polymers can also be obtained by chemically incorporated, base-neutralized acid groups, more particularly carboxyl groups, or by chemically incorporated acid-neutralized tertiary amino groups (cf. for example DE-OS No. 2,749,692, EP-A No. 218,906 or L. Dulog, Die Angew. Makro. Chemie 123/124 (1984), pages 437 et seq). During the curing of coatings containing such binders, the films become insoluble in water through dissociation of the hydrophilic salt groups and evaporation of the volatile neutralizing agents. However, depending on the type of neutralizing agent used and the hardening conditions, large quantities of neutralizing agent may remain in the film.

If the predominant quantity of neutralizing agent remains in the film, the resulting hydrophilic salt groups represent potential points of attack, for example for moisture, such that the quality of the coatings can be adversely affected. By contrast, evaporation of the amine in relatively large quantities results in environmental concerns, especially when relatively large quantities of volatile, organic auxiliary solvents are also used.

To reduce environmental pollution, expensive absorption or incineration plants are necessary.

For these reasons, there is a need for water-based coating compositions which contain very little organic solvent and, in addition, only require a small quantity of volatile neutralizing agents.

In addition, a water-based coating composition is expected to have a high solids content in water. This is desirable for energy-saving reasons, for example, reduced transport costs and a relatively low heat demand for evaporating the water during the curing of the binders. In addition, more favorable application or film properties, including greater layer thicknesses, can be obtained. Dry film thicknesses of 50 to 70 μm are generally difficult to achieve with water-based binders because there is a pronounced tendency towards the formation of boiling-induced bubbles, craters and other film defects. These defects are normally eliminated or reduced by the addition of volatile high-boiling solvents, organic auxiliary solvents or similar additives, although their addition makes the binders less environmentally acceptable.

Water-based binders are also expected to provide high resistance to hydrolysis and storage although this is not always the case, particularly with low-solvent binders.

Highly flexible coatings are being increasingly used in many fields of application, for example, in industrial coatings, in automotive non-chip coatings and fillers, for crack-covering coatings, etc. Newly developed binders should enable highly flexible coatings to be produced, whether in combination with crosslinking resins or as a flexibilizing additive to existing binder compositions having insufficient flexibility.

Accordingly, an object of the present invention is to provide a water-based binder for high-solids stoving lacquers which satisfy the previously stated requirements. The coatings produced with this binder should contain less than 6.0% by weight, preferably less than 4.5% by weight and more preferably no organic solvent; contain less than 1.1% by weight, preferably less than 0.9% by weight, of neutralizing agent; and have a solid contents of $\geq 50\%$ by weight, preferably $\geq 54\%$ by weight. In addition, the binder should contain free hydroxyl groups to allow crosslinking reactions at temperatures $> 110°$ C. The binders according to the invention should be suitable for the production of flexible coatings and, in addition, should be capable of being applied without difficulty in considerable layer thicknesses. In combination with crosslinking resins to form stoving lacquers, the binders according to the invention should be stable in storage.

It has now surprisingly been found that these objectives may be achieved with the binders of the present invention described in more detail hereinafter.

SUMMARY OF THE INVENTION

The present invention relates to aqueous polyesters for high-solids stoving coatings which contain a) 35.0 to 65.0% by weight of a polyester resin containing urethane, carboxyl and hydroxyl groups, having an acid number of less than 22, a hydroxyl number of 40 to 110, a molecular weight of 8,000 to 50,000 and a urethane group content (—NH—CO—O—) of 6.5 to 11% by weight, and containing the reaction product of
  1) 77 to 89% by weight of a branched polyester polyol having a hydroxyl number of 125 to 175, an acid number of less than 4 and a molecular weight of 2,500 to 6,500,
  2) 2.5 to 4.5% by weight of a 2,2-bis-(hydroxymethyl)alkane carboxylic acid,
  3) 0 to 3.5% by weight of a diol component having a molecular weight of 62 to 250 and
  4) 9 to 19% by weight of a diisocyanate component, wherein the percentages of a1), a2), a3) and a4) add up to 100%, based on the weight of a1), a2), a3) and a4), b) 0.1 to 1.5% by weight of a basic neutralizing agent which is sufficient to convert 35 to 100% of the carboxyl groups of component a) to carboxylate groups.

c) 0 to 7.5% by weight of an organic auxiliary solvent and d) 26 to 64.9% by weight water,
wherein the percentages of a), b), c) and d) add up to 100%, based on the weight of a), b), c) and d).

The present invention also relates to aqueous, storage stable, high-solids stoving lacquers having a solids content of at least 50% by weight and containing
A) 60 to 95% by weight of the aqueous polyesters previously described,
B) 5 to 40% by weight of at least one hydroxy-reactive crosslinking resin and
C) 0 to 180% by weight, based on the solids content of A) and B), of auxiliaries and additives,
wherein the percentages of A) and B) are based on solids and add up to 100%, based on the weight of A) and B), and wherein the lacquers optionally contain up to 6.0% by weight, based on their total weight, of organic solvents and up to 1.1% by weight, based on their total weight, of volatile neutralizing agents.

The present invention further relates to a process for the production of the previously described aqueous polyesters by combining a solution in organic solvent c) of polyester polyol a1), acid a2) and, optionally, diol a3) with diisocyanate component a4), allowing the spontaneous isocyanate addition reaction to take place in the presence of suitable urethanization catalysts until no more NCO groups can be detected, adding basic neutralizing agent b) and water d), and optionally at least partially removing the solvent by distillation.

DETAILED DESCRIPTION OF THE INVENTION

In the context of the invention,
"polyester polyols" are the 100% reaction product of polybasic carboxylic acids or carboxylic anhydrides and polyhydric alcohols;
"polyester binders or resins" are the reaction product of "polyester polyols" with the above-mentioned reactants a2), a4) and optionally a3) and
"aqueous polyesters" are the aqueous/(organic) solutions or dispersions of the at least partly neutralized "polyester binders or resins."

The polyesters according to the invention preferably contain
35.0 to 65.0% by weight of a),
0.1 to 1.1% by weight of b),
0.0 to 6.5% by weight of c) and
27.4 to 64.9% by weight of d).

Component a) is based on a polyester resin containing urethane, carboxyl and hydroxyl groups which has a weight average molecular weight ($M_w$, as determined by gel permeation chromatography using polystyrene as standard) of 8,000 to 50,000, preferably 10,000 to 29,000; an acid number of less than 22, preferably 12 to 20; and a hydroxyl number of 40 to 110, preferably 60 to 100. The hydroxyl and acid values are based on the quantity of KOH in "mg" which is used to titrate 1 g of solids.

The content of urethane groups in the resin is 6.5 to 11.0, preferably 7.0 to 10.3% and more preferably 7.0 to 8.5% by weight.

Component a) is based on the reaction product of
a1) 77 to 89% by weight, preferably 79 to 87% by weight, of a branched polyester polyol having a hydroxyl number of 125 to 175, preferably 140 to 165, an acid number of less than 4, preferably less than 2.2, and a molecular weight ($M_w$) of 2,500 to 6,000, preferably 3,500 to 5,000, a2) 2.5 to 4.5% by weight, preferably 3.25 to 4.1% by weight, of a 2,2-bis-(hydroxymethyl)-alkane carboxylic acid, preferably dimethylol propionic acid,
a3) 0 to 3.5% by weight, preferably 0 to 2% by weight, of a diol component having a molecular weight of 62 to 250 and
a4) 9 to 19% by weight, preferably 10 to 17% by weight and more preferably 10 to 14.5% by weight, of a diisocyanate component having a molecular weight of 168 to 300, wherein preferably at least 50 mole %, more preferably 100 mole %, of component a4) is hexamethylene diisocyanate,
wherein the percentages add up to 100, based on the weight of these components and the equivalent ratio of isocyanate groups of component a4) to hydroxyl groups of components a1) to a3) is 0.35:1 to 0.8:1.

The branched polyester polyols a1) are preferably based on the reaction product of
a1,i) 40 to 48 mole %, more preferably 42 to 46 mole %, of 1,6-hexanediol, neopentyl glycol and/or 1,4-cyclohexane dimethanol,
a1,ii) 8 to 14 mole % of trimethylol propane and/or glycerol, more preferably 8 to 12 mole % of trimethylol propane,
a1,iii) 25 to 39 mole % of isophthalic acid, phthalic anhydride and/or hexahydrophthalic anhydride, more preferably 25 to 29 mole % of isophthalic acid and 4 to 7 mole % of phthalic anhydride and/or hexahydrophthalic anhydride,
a1,iv) 8 to 14 mole of % adipic acid, sebacic acid and/or azelaic acid, more preferably 10 to 12.5 mole % of adipic acid and
a1,v) 0 to 1.5 mole % of other carboxylic acids,
wherein the percentages add up 100, based on weight the components.

The branched polyester polyols a1) are in known manner from the these starting materials. The reaction may take place in the presence of known esterification catalysts, preferably in the melt or with azeotropic condensation at a temperature of 140° to 240° C. with elimination of water. The reaction may be conducted under vacuum.

When components a1,i) to a1,v) are subjected to azeotropic esterification, the entraining agent (e.g., isooctane, xylene, toluene or cyclohexane) is distilled off under vacuum on completion of the reaction.

Component a2) is based on a 2,2-bis-(hydroxymethyl)-alkane carboxylic acid containing a total of at least 5 carbon atoms, preferably 2,2-bis-(hydroxymethyl)-propionic acid (dimethylol propionic acid).

Component a3) is a (cyclo)aliphatic diol component having a molecular weight of 62 to 250. Suitable (cyclo)aliphatic diols include ethylene glycol, 1,2- and 1,3-propylene glycol, neopentyl glycol, butane-1,3-diol, butane-1,4-diol, 1,4-cyclohexanedimethanol, hexane-1,6-diol, butane-2,3-diol, diethylene glycol, triethylene glycol, dipropylene glycol, 1,4-cyclohexanediol, octane-1,8-diol, hydrogenated bisphenols, tricyclodecane dimethanol (TCD diol) butene-1,4-diol, butyne-1,4-diol and mixtures of these diols.

Component a4) is a diisocyanate component having a molecular weight of 168 to 300. Suitable diisocyanates include 1-isocyanato-3,3,5-trimethyl-5-isocyanatomethyl cyclohexane (isophorone diisocyanate or IPDI), perhydro-2,4'- and -4,4'-diphenyl methane diisocyanate, 2,4- and 2,6-toluene diisocyanate and hexamethylene diisocyanate. Component a4) is preferably based on at least 50 mole %, more preferably 100 mole % of hexamethylene diisocyanate.

Polyester resin a) may be produced by mixing branched polyester polyol a1), 2,2-bis-(hydroxymethyl)-alkane carboxylic acid a2) and, optionally, aliphatic diol component a3) in an organic solvent, which is preferably water-miscible, adding the diisocyanate component a4) over a period of 1 minute to 4 hours at 20° to 120° C. and then heating the reaction mixture until no more NCO groups are present.

The reaction is carried out in the presence of suitable catalysts, e.g., dibutyl tin oxide, tin (II) octoate, dibutyl tin dilaurate or tertiary amines such as triethyl amine, which are generally added in quantities of 0.005 to 1% by weight, based on the weight of the reaction mixture as a whole. To additionally increase the rate, the reaction may also be carried out under pressure at relatively high temperatures. The reaction is preferably carried out in inert solvents, such as acetone or methyl ethyl ketone, at solids contents of 40 to 96% by weight.

After the urethanization reaction, the basic neutralizing agent b) is added in a quantity of 0.1 to 1.5% by weight, preferably 0.1 to 1.1% by weight, based on the weight of the aqueous polyester. Suitable basic neutralizing agents b) include ammonia, triethyl amine, triethanolamine, dimethyl ethanolamine, monoethanolamine, diethanolamine, N-methyl diethanolamine, morpholine, N-methyl morpholine, 2-amino-2-methyl-l-propanol and mixtures of these bases. Dimethyl ethanolamine, N-methyl morpholine, methyl diethanolamine and ammonia are preferred. Alkali metal hydroxides, such as sodium or potassium hydroxide, may also be used, but are less preferred. A neutralizing agent need not be added when a tertiary amine, such as triethyl amine, has been used as the catalyst for the isocyanate addition reaction, because this catalyst can also act as a neutralizing agent, provided that it is used in the proper quantity.

Deionized water, component d), is added to the polyester resin to form the aqueous polyester. The organic solvent may be partly or completely distilled off, optionally under vacuum. The quantity of water used is preferably selected so that the resulting aqueous polyester has a solids content of 35 to 65% by weight.

The water used may also be partly distilled off to obtain as high a solids content as possible. The polyesters A) according to the invention generally contain 0 to 7.5%, preferably 0 to 6.5%, by weight of organic solvents, so that coating compositions have a maximum solvent content of 6.0% by weight, based on weight of the coating compositions.

The polyesters A) according to the invention may be combined with water-dilutable or water-dispersible OH-reactive crosslinking agents. However, hydrophobic substances which are not dispersible in water on their own may also be used as the crosslinking resins because the polyester binders containing urethane, hydroxyl and carboxylate groups can perform the function of an emulsifier for the crosslinking resins.

Suitable crosslinking resins B) include water-dilutable or water-dispersible melamine-formaldehyde or urea-formaldehyde condensates of the type described, for example, in D. H. Solomon, The Chemistry of Organic Filmformers, pages 235 et seq, John Wiley & Sons, Inc., New York, 1967. However, the melamine resins may also be completely or partly replaced by other crosslinking amino resins of the type described, for example, in "Methoden der organischen Chemie" (Houben-Weyl), Vol. 14/2, Part 2, 4th Edition, Georg Thieme Verlag, Stuttgart 1963, pages 319 et seq.

Other suitable crosslinking resins are blocked polyisocyanates based on, for example, isophorone diisocyanate, hexamethylene diisocyanate, 1,4-diisocyanatocyclohexane, bis-(4-isocyanatocyclohexyl)-methane, 1,3-diisocyanatobenzene, 1,4-diisocyanatobenzene, 2,4-diisocyanato-1-methyl benzene, 1,3-diisocyanato-2-methyl benzene, 1,3-bis-isocyanatomethyl benzene, 2,4-bis-isocyanatomethyl-1,5-dimethyl benzene, bis-(4-isocyanatophenyl)-propane, tris-(4-isocyanatophenyl)methane and trimethyl-1,6-diisocyanatohexane. Also suitable are blocked polyisocyanates adducts such as biuret polyisocyanates based on 1,6-diisocyanatohexane; isocyanurate polyisocyanates based on 1,6-diisocyanatohexane; or urethane-modified polyisocyanate adducts prepared from 2,4-and/or 2,6-diisocyanatotoluene or isophorone diisocyanate and low molecular weight polyhydroxyl compounds (such as trimethylol propane, the isomeric propane diols or butane diols or mixtures of such polyhydroxyl compounds), wherein the isocyanate groups of the polyisocyanate adduct are blocked.

Suitable blocking agents for these polyisocyanates include monohydric alcohols such as methanol, ethanol, butanol, hexanol and benzyl alcohol; oximes such as acetoxime and methyl ethyl ketoxime; lactams such as ε-caprolactam; phenols; and CH-acidic compounds such as diethyl malonate.

Preferred crosslinking resins are melamine and urea resins, more preferably alkylated melamine/ formaldehyde resins containing 1 to 8 carbon atoms in the alkyl chain, such as butylated, methylated and/or methoxymethylated melamine resins.

The water-based coating compositions according to the invention are produced by mixing A) 60 to 95% by weight, preferably 65 to 90% by weight, of polyesters A) with B) 5 to 40% by weight, preferably 10 to 35% by weight, of at least one of the previously described hydroxy-reactive crosslinking resins, wherein the percentages for A) and B) are based on solids, and the sum of A) and B) is 100, and C) 0 to 180% by weight, preferably 10 to 140%, by weight of the auxiliaries and additives which are known from coatings technology, the composition of the individual components being selected so that the stoving lacquer has an organic solvent content of at most 6%, preferably at most 4.5% by weight; a content of volatile neutralizing agents of at most 1.1, preferably at most 0.9% by weight; and a solids content of at least 50% by weight, preferably at least 54% by weight.

The optional auxiliaries and additives C) include pigments (such as titanium dioxide, iron oxide, lead oxide and zinc oxide), fillers (such as alkaline earth metal silicates, carbon black, which may also act as a filler, talcum and graphite), organic dyes, flow control agents, foam inhibitors, UV absorbers, anti-sedimenting agents, thickeners, wetting agents, antioxidants, antiskinning agents and crosslinking catalysts.

In the coating compositions according to the invention, the polyesters A) crucial to the invention may be present in combination with other hydroxy-functional polymers D) in an amount, based on solids, of up to 400% by weight of the quantity of component a) present in component A). When component D) is present, the amount of component B), based on solids, is 5 to 50% by weight, based on the weight of component a) present in component A) and component D).

Examples of hydroxy-functional polymers D) include those described in DE-OS No. 2,528,212, DE-OS 2,556,621 and EP-A No. 0,218,906.

Preferred applications for the binder compositions according to the invention include stoving filler coatings and wet-on-wet non-chip primers of the type used in automotive coatings. The coatings according to the invention may also be used for coating plastic, film, metal, wood and mineral substrates. They are also suitable as high-solids one-coat finishing coatings on optionally pretreated substrates.

The stoving coatings according to the invention may contain the auxiliaries and additives known from lacquer technology and may be applied to the substrate to be coated by methods known per se, such as spray coating, flood coating, casting, dip coating, roll coating, spread coating.

The stoving lacquers according to the invention possess prolonged stability in storage both at room temperature and at moderately elevated temperatures of up to 50° C. and cure at temperatures above 100° C., preferably at temperatures above 110° C., to form crosslinked films having a excellent properties.

In the following examples, all parts and percentages are by weight, unless otherwise indicated.

EXAMPLES

Example 1

Polyester polyol a1)

a1,i) 8,496 g (44.4 mole %) hexane-1,6-diol
a1,ii) 2,412 g (11.1 mole %) trimethylol propane
a1,iii) 7,470 g (27.8 mole %) isophthalic acid
a1,iv) 2,628 g (11.1 mole %) adipic acid
a1,v) 1,332 g 5.6 mole %) phthalic anhydride were weighed into a 25 liter reaction vessel equipped with a stirrer, cooling and heating system and a water separator and heated in 1 hour to 140° C. while nitrogen was passed through. The reaction mixture was then heated to 220° C. over a period of 7 hours and esterified with elimination of water until the acid number was ≈2. The branched polyester resin thus produced had a hydroxyl number of 152. Its flow viscosity (4 mm DIN cup, 23° C., 70% in xylene) was 115 seconds and its molecular weight ($M_w$) was 4,300.

Aqueous polyester according to the invention 889.3 g of polyester polyol a1), 31.2 g dimethylol propionic acid and 1.3 g tin(II) octoate were dissolved in 1,321.5 g acetone and the resulting solution was heated to 58° C. 119.6 g hexamethylene diisocyanate were then added over a period of 45 minutes. The reaction mixture was stirred until no more NCO groups were detected. 8.3 g dimethyl ethanolamine were added, followed after 15 minutes by 840 g deionized water.

The acetone was distilled off in a light vacuum (40 to 65 torr) at a bath temperature of 40° to 50° C. The resulting aqueous polyester 1) contained a) 55.4% by weight of a polyester resin containing urethane, hydroxyl and carboxyl groups,
b) 0.4% by weight dimethyl ethanolamine and
d) 44.2% by weight water.

Component a) had a molecular weight ($M_w$) of 19,500, an acid number of 15 and a degree of neutralization of 40%.

Example 2

1,870 g of polyester polyol a1) from Example 1, 88 g dimethylol propionic acid, 2.8 g tin(II) octoate and 329 g N-methyl pyrrolidone were weighed under nitrogen into a 5 liter reaction vessel, heated to 120° C. and stirred for 30 minutes. After cooling to 70° C., 242 g hexamethylene diisocyanate were added all at once; the temperature rose to 90° C. The reaction mixture was heated to 130° C. in 2 hours and kept at that temperature until no more NCO groups were detected. After cooling to 100° C., 58.4 g dimethyl ethanolamine and 2,910 g deionized water were added. The resulting aqueous polyester 2) contained a) 40.5% by weight of a polyester resin containing urethane, hydroxyl and carboxyl groups,
b) 1.0% by weight dimethyl ethanolamine,
c) 6.0% by weight N-methyl pyrrolidone, and
d) 52.5% by weight water.

Component a) had an acid number of 18, a degree of neutralization of approximately 95%, a urethane group content of approximately 7.7% by weight and a hydroxyl number of approximately 90.

Example 3

1,726.6 g of polyester polyol a1) from Example 1, 83.2 g dimethylol propionic acid, 2.6 g tin(II) octoate and 270.4 g hexamethylene diisocyanate were reacted in 2,643 g acetone as in Example 1. After the reaction, 22.1 g dimethyl ethanolamine and 2,080 g water were added, and then acetone and excess water were distilled off. The resulting aqueous polyester 3) contained a) 55.9% by weight of a polyester resin containing urethane, hydroxyl and carboxyl groups,
b) 0.6% by weight dimethyl ethanolamine and
d) 43.5% by weight water.

Component a) had a molecular weight of approximately 20,000, an acid number of approximately 19, a degree of neutralization of approximately 40%, a urethane group content of approximately 9.1% by weight and a hydroxyl number of approximately 77.

Example 4

1,664 g polyester polyol a1) from Example 1, 72.8 g dimethylol propionic acid, 41.6 g neopentyl glycol, 2.6 g tin(II) octoate and 301.6 g hexamethylene diisocyanate were reacted in 2,643 g acetone as in Example 1. After the reaction, 19.3 g dimethyl ethanolamine and then 2,542 g water were added, and then acetone and excess water were distilled off. The resulting aqueous polyester 4) contained a) 52.1% by weight of a polyester resin containing urethane, hydroxyl and carboxyl groups,
b) 0.5% by weight dimethyl ethanolamine and
d) 47.4% by weight water.

Component a) had a molecular weight of approximately 26,000, an acid number of approximately 17, a degree of neutralization of 40%, a urethane group content of approximately 10.1% by weight and a hydroxyl number of approximately 75.

Example 5

Polyester polyol a2)

a2,1)

813 g (22.2 mole %) hexane-1,6-diol
992 g (22.2 mole %) 1,4-cyclohexanedimethanol
a2,2) 462 g (11.1 mole %) trimethylol propane
a2,3) 1,430 g (27.8 mole %) isophthalic acid
a2,4) 503 g (11.1 mole %) adipic acid and
a2,5) 265 g (5.6 mole %) hexahydrophthalic anhydride were weighed into a 5 liter reaction vessel equipped with a stirrer, heating and cooling system and a water separator and heated in 1 hour to 140° C. in a nitrogen atmosphere. The reaction mixture was then heated to 220° C. over a period of 8 hours and esterified until the acid number was $\leq 2$. The resulting branched polyester resin had a hydroxyl number of 145.

Aqueous polyester according to the invention 863.3 g of polyester polyol a2) described above, 41.6 g dimethylol propionic acid and 1.3 g tin(II) octoate were reacted with 135.2 g hexamethylene diisocyanate in 1,322 g acetone as in Example 1. After the reaction, 12.4 g dimethyl ethanolamine and then 1,040 g water were added. After removal of acetone by distillation, the resulting aqueous polyester 5) contained a) 50.2% by weight of a polyester resin containing urethane, hydroxyl and carboxyl groups,
b) 0.6% by weight dimethyl ethanolamine and
d) 49.2% by weight water.

Component a) had an acid number of approximately 19, a degree of neutralization of approximately 45%, a urethane group content of approximately 9.1% by weight and a hydroxyl number of approximately 66.

Example 6

1,870 g of polyester polyol a1) from Example 1, 88 g dimethylol propionic acid, 2.8 g tin (II) octoate and 252 g hexamethylene diisocyanate were reacted in 191 g N-methyl pyrrolidone as in Example 1.

After the reaction, 58.6 g dimethyl ethanolamine and 3,050 g water were added. The resulting aqueous polyester 6) contained a) 40.0% by weight of a polyester resin containing urethane, hydroxyl and carboxyl groups,
b) 1.0% by weight dimethyl ethanolamine,
c) 3.5% by weight N-methyl pyrrolidone and
d) 55.5% by weight water.

Component a) had a molecular weight ($M_w$) of approximately 12,000, an acid number of approximately 19, a degree of neutralization of approximately 95%, a urethane group content of approximately 7.7% by weight and a hydroxyl number of approximately 90.

Application Examples

For water-based binders, the binders -according to the invention showed very little tendency towards foaming either in the production of clear coatings or in the production of pigmented stoving fillers (ratio of binder to melamine resin to pigment+filler to auxiliary=39:6:53:2 parts by weight). A dissolver-type stirrer was used so that the waiting time between grinding and application was shortened and, at the same time, safer application was guaranteed.

Example 7 (pigmented finishing lacquer)

The polyester of Example 2 was tested by comparison with a commercially available aqueous polyester resin (hydroxyl- and carboxylate-functional polyester resin having a OH-number of 40, an acid number of 40 and being dissolved as 55% by weight solution in a mixture of water, butyl glycol, isobutanol and N,N-dimethyl -ethanolamine in a weight ratio of 20:15:6:4, Bayhydriol D 155, a product of Bayer AG) on steel plates as a white-pigmented finishing lacquer in combination with an amino crosslinking resin. The ratio of binder to crosslinking resin (Cymel 327, a product of American Cyanamid) was 70:30 and the pigmenting level (Bayertitan R-KB-4) was 100% based on the solids content of the aqueous polyester and the crosslinking resin. The films were stoved for 10 minutes at 160° C. The thickness of the lacquer film was approximately 35 μm.

|  | Invention | Comparison |
| --- | --- | --- |
| Coatings solids | 58.3% | 44.8% |
| Organic solvent in lacquer | 4.0% | 10.2% |
| Degree of neutralization | 100% | 110% |
| pH number | 8.3 | 8.7 |
| viscosity[1] | 44 s | 46 s |
| Gloss 20°/60° | 68/89 | 58/91 |
| Pencil hardness | 5 H | 2 H |
| Erichsen indentation | 7.7 mm | 7.8 mm |
| Whiteness[2] | 89/83 | 89/83 |
| MEK rubbing test[3] | O.K. | 100 × soft, matt |
| Coating viscosity after storage for 2 weeks at 40° C.[1] | 44 s | 120 s |

[1] Flow time from a DIN 4 cup at 23° C.
[2] The two whiteness values (Elrepho) were determined after stoving for 10 minutes at 160° C. and for 1 hour at 180° C., respectively.
[3] The coating was double rubbed 100 times with a cotton wool pad soaked with methyl ethyl ketone to obtain an indication of the degree of crosslinking. O.K. = satisfactory It was possible with the polyester according to the invention to formulate white-pigmented finishing coating compositions which combined a considerably higher solids content (+13% absolute) with a distinctly reduced content of volatile organic solvents (−6% absolute). The stoving lacquers according to the invention possessed excellent viscosity and storage stability when stored at high temperatures. The coatings produced with them have improved gloss, hardness and solvent resistance.

Example 8 (intermediate non-chip primers)

Intermediate non-chip primers were produced using polyesters 1), 3), 4) and 5). The aqueous polyester was used in an amount which corresponded to 75 parts by weight solids and was mixed with 25 parts by weight of a commercially available melamine resin (Cymel 327, a product of American Cyanamid), 25 parts by weight microtalcum, 0.5 part by weight foam inhibitor DNE (Bayer AG), 3.0 parts by weight flow control agent (Additol XW 395, a product of Hoechst AG) and 1 part by weight anti-sedimenting agent (Aerosil R972, a product of Degussa AG). The resulting primers (solids content approx. 55%) were applied to metal plates, aired for 40 minutes at room temperature and then stoved for 20 minutes at 165° C. The layer thickness was approx. 20 μm.

The following results were obtained:

| Polyester binder | Pendulum hardness acc. to DIN 53 157 (sec.) | Dissolvability* | Erichsen indentation acc. to DIN 53 156 (mm) |
| --- | --- | --- | --- |
| 1 | 65 | 0 1 2 2 | >10 |
| 3 | 76 | 1 1 1 2 | >10 |
| 4 | 66 | 0 0 1 2 | >10 |

-continued

| Polyester binder | Pendulum hardness acc. to DIN 53 157 (sec.) | Dissolvability* | Erichsen indentation acc. to DIN 53 156 (mm) |
|---|---|---|---|
| 5 | 95 | 0 0 1 2 | >10 |

*Dissolvability was tested by applying a solvent-containing cotton wool pad to the coating for 5 minutes. Xylene, methoxypropyl acetate, ethyl acetate and acetone were used as the solvents. Evaluation was based on a scale of 0 to 5 in which 0 = satisfactory and 5 = dissolved.

The films obtained were all clear, homogeneous, highly flexible and crosslinked.

Example 9

The use of a polyester according to the invention to increase the solids content of and provide flexibility to a stoving filler lacquer was tested in the following example. The following components were used:

a) a water-soluble, OH-functional polyester without urethane groups modified with trimellitic anhydride, solids content 63% in water, butyl glycol, dimethyl ethanolamine (20:12:5), OH number 59, acid number 50,
b) polyester 3 (solids content 55.9%),
c) commercially available crosslinking amino resin Maprenal MF 904 (a product of Hoechst AG), as supplied
d) pigment mixture containing 54.5 parts by weight Bayer-Titan R-KB-4 (a product of Bayer, Leverkusen), 0.5 part by weight Bayferrox 303 T (a product of Bayer AG, Leverkusen) and 25 parts by weight microtalcum
e) a commercially available flow control agent (AdditoL XW 395, as supplied, a product of Hoechst AG)
f) a commercially available thickener (Bermodul PUR 2100, 5%, a product of Langer & Co.)
g) a commercially available foam inhibitor (Entschaumer DNE, as supplied, as supplied, a product of Bayer AG)
h) a commercially available anti-sedimenting agent (Aerosil R 972, as supplied, a product of Degussa AG)
i) a commercially available plasticizer (Unimoll BB, as supplied, a product of Bayer AG)

| Component | Lacquer 1 (parts by weight) | Lacquer 2 (parts by weight) |
|---|---|---|
| a) | 105 | 139.9 |
| b) | 39.4 | — |
| c) | 12.6 | 12.6 |
| d) | 80 | 80 |
| e) | 3.0 | 3.0 |
| f) | 4.0 | 4.0 |
| g) | 0.5 | 0.5 |
| h) | 1.5 | 1.5 |
| i) | 1.0 | 1.0 |

The coating compositions were diluted with water to application viscosity (flow time 30 seconds, DIN 4 cup, 23° C.) and applied by spraying to metal plates.

| | Lacquer 1 | Lacquer 2 |
|---|---|---|
| Solids | 54% | 47% |
| Pendulum hardness (DIN 53 157) (sec.) | 135 | 164 |
| Erichsen indentation (DIN 53 156) (mm) | 7 | 4 |
| Dissolvability (xylene, MPA, ethylacetate, acetone) | 0 0 2 2 | 1 1 3 4 |
| Cross-hatch adhesion test 0 to 5 | Gt 0 | Gt 0 |

Testing in an automotive coating system between a CED primer and finish lacquer:

| | Lacquer 1 | Lacquer 2 |
|---|---|---|
| Non-chip effect VDA bombardment test[1] 2 × 500 g/l bar | 1 | 2 |
| "Hahnenpick" test[2] RT/−20° C. | <2/<2 | <2/4 |
| DOJ number (film optics) | 80 | 70 |
| Condensation test, 480 h | Satisfactory | Satisfactory |

[1]Values from 1 to 6. 1 = very good adhesion 6 = no adhesion
[2]Daimler Benz test; result expressed as the surface chipped off in mm² <2 = very good, 4 = average number By replacing ¼ of the conventional binder with a binder according to the invention, the stoving filler formulation was distinctly increased in its solids content, elasticity, chip protection and film optics. In addition, the obtainable, defect-free layer thickness was increased to 65 μm, which is in line with practical requirements.

Example 10

1,794.2 g polyester polyol a1) of Example 1, 57.2 g dimethylol propionic acid and 2.6 tin(II) octoate were dissolved in 2,643 g acetone and reacted at 58° C. with 228.8 g hexamethylene diisocyanate. When no more NCO groups were detected, 15.2 g dimethyl ethanolamine and 1,520 g deionized water were added. The resulting aqueous polyester 10) contained a) 57.7% by weight of a polyester resin containing urethane, hydroxyl and carboxyl groups,
b) 0.4% by weight dimethyl ethanolamine and
d) 41.9% by weight water.

Component a) had a molecular weight ($M_w$) of approximately 19,000, an acid number of 13.5, a degree of neutralization of approximately 40%, a urethane group content of approximately 7.7% by weight and a hydroxyl of approximately 81.

Polyester 10) was tested by comparison with a commercially available aqueous polyester resin (Bayhydrol D 155, a product of Bayer AG) on high-gloss plates as a white one-coat stoving lacquer in combination with a crosslinking amino resin.

The ratio of polyester to melamine resin (Cymel 327, a product of American Cyanamid) was 80:20 and the pigmenting level (Bayertitan R-KB-4) was 100%. The spray viscosity was approx. 40 sec. (DIN 4 mm cup at 23° C.). Both coatings were adjusted to a pH number of 8.7. The films were stoved for 10 minutes at 160° C.

| | Invention | Comparison |
|---|---|---|
| Coatings solids | 55.2% | 45.5% |
| Organic solvent in lacquer | 0.6% | 10.2% |
| Boiling bubble limit (layer thickness) | 70 μm | 50 μm |
| Gloss (60) | 83 | 91 |
| MEK rubbing test[1] | 100x, soft | 100x, soft, matt |

-continued

| | Invention | Comparison |
|---|---|---|
| Nail hardness | Almost nail-hard | Nail-hard |
| Whiteness[2] (Elrepho) | 89/87 | 90/85 |

[1] The coating was double rubbed 100 times with a cotton wool pad soaked with methyl ethyl ketone to obtain an indication of the degree of crosslinking.
[2] The two whiteness values were determined after stoving for 10 minutes at 160° C. and for 1 hour at 180° C., respectively.

It was possible with the polyester according to the invention to formulate white coating compositions which, for comparable film properties, had an approximately 10% higher solids content and, in addition, a volatile organic solvent content of only 0.6 as opposed to 10.2%. The coating composition satisfied stringent requirements in regard to solvent emission during the application of the coating compositions. In addition, distinctly greater film thicknesses with no boiling bubbles were obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polyester for high-solids stoving lacquers which comprises
   a) 35.0 to 65.0% by weight of a polyester resin containing urethane, carboxyl and hydroxyl groups, having an acid number of less than 22, a hydroxyl number of 40 to 110, a molecular weight of 8,000 to 50,000 and a urethane group content (—NH—CO—O—) of 6.5 to 11% by weight, and comprises the reaction product of
      1) 77 to 89% by weight of a branched polyester polyol having a hydroxyl number of 125 to 175, an acid number of less than 4 and a molecular weight of 2,500 to 6,500,
      2) 2.5 to 4.5% by weight of a 2,2-bis-(hydroxymethyl)-alkane carboxylic acid,
      3) 0 to 3.5% by weight of a diol component having a molecular weight of 62 to 250 and
      4) 9 to 19% by weight of a diisocyanate component containing at least 50 mole % of hexamethylene diisocyanate,
   wherein the percentages of a1), a2), a3) and a4) add up to 100%, based on the weight of a1, a2), a3) and a4),
   b) 0.1 to 1.5% by weight of a basic neutralizing agent which is sufficient to convert 35 to 100% of the carboxyl groups of component a) to carboxylate groups,
   c) 0 to 7.5% by weight of an organic auxiliary solvent and
   d) 26 to 64.9% by weight water,
   wherein the percentages of a), b), c) and d) add up to 100%, based on the weight of a), b), c) and d).

2. The aqueous polyester of claim 1 which comprises
   a) 35.0 to 65.0% by weight of a polyester resin containing urethane, carboxyl and hydroxyl groups, having an acid number of 12 to 20, a hydroxyl number of 60 to 100, a molecular weight of 10,000 to 29,000 and a urethane group content (—NH—CO—O—) of 7.0 to 10.3% by weight, and comprises the reaction product of
      1) 79 to 87% by weight of a branched polyester polyol having a hydroxyl number of 140 to 165, an acid number of less than 2.2 and a molecular weight of 3,500 to 5,000,
      2) 3.25 to 4.1% by weight of dimethylol propionic acid,
      3) 0 to 2% by weight of a diol component having a molecular weight of 62 to 250 and
      4) 10 to 17% by weight of said diisocyanate component,
   wherein the percentages of a1), a2), a3) and a4) add up to 100%, based on the weight of a1), a2), a3) and a4),
   b) 0.1 to 1.1% by weight of a basic neutralizing agent which is sufficient to convert 35 to 100% of the carboxyl groups of component a) to carboxylate groups,
   c) 0 to 6.5% by weight of an organic auxiliary solvent and
   d) 27.4 to 64.9% by weight water,
   wherein the percentages of a), b), c) and d) add up to 100%, based on the weight of a). b), c) and d).

3. The aqueous polyester of claim 1 wherein said branched polyester polyol comprises the esterification product of
   a1,i) 40 to 48 mole % of 1,6-hexanediol, neopentyl glycol and/or 1,4-cyclohexane dimethanol,
   a1,ii) 8 to 14 mole % of trimethylol propane and/or glycerol,
   a1,iii) 26 to 39 mole % of isophthalic acid, phthalic anhydride and/or hexahydrophthalic anhydride,
   a1,iv) 8 to 14 mole % of adipic acid, sebacic acid and/or azelaic acid and
   a1,v) 0 to 15 mole % other carboxylic acids,
   wherein the percentages of components a1,i) to a1,v) add up to 100%, based on the weight of a1,i) to a1,v).

4. The aqueous polyester of claim 2 wherein said branched polyester polyol comprises the esterification product of
   a1,i) 40 to 48 mole % of 1,6-hexanediol, neopentyl glycol and/or 1,4-cyclohexane dimethanol,
   a1,ii) 8 to 14 mole % of trimethylol propane and/or glycerol,
   a1,iii) 26 to 39 mole % of isophthalic acid, phthalic anhydride and/or hexahydrophthalic anhydride,
   a1,iv) 8 to 14 mole % of adipic acid, sebacic acid and/or azelaic acid and
   a1,v) 0 to 15 mole % other carboxylic acids,
   wherein the percentages of components a1,i) to a1,v) add up to 100%, based on the weight of a1,i) to a1,v).

5. An aqueous, storage stable, high-solids stoving lacquer having a solids content of at least 50% by weight and comprising
   A) 60 to 95% by weight of the aqueous polyester of claim 1,
   B) 5 to 40% by weight of at least one hydroxy-reactive crosslinking resin and
   C) 0 to 180% by weight, based on the solids content of A) and B), of auxiliaries and additives,
   wherein the percentages of A) and B) are based on solids and add up to 100%, based on the weight of A) and B), and wherein the lacquer may contain up to 6.0% by weight, based on their total weight, of organic solvents and up to 1.1% by weight, based on their total weight, of volatile neutralizing agents.

6. The stoving lacquer of claim 5 wherein the hydroxy-reactive crosslinking resin comprises one or more water-dilutable or water-dispersible melamine-formaldehyde condensates.

* * * * *